(12) United States Patent
Ono (10) Patent No.: US 9,347,483 B2
(45) Date of Patent: May 24, 2016

(54) FALL-OFF PREVENTING STRUCTURE OF PROPELLER SHAFT

(75) Inventor: Yohei Ono, Ageo (JP)

(73) Assignee: UD TRUCKS CORPORATION, Saitama (JP)

( * ) Notice: Subject to any disclaimer, the term of this patent is extended or adjusted under 35 U.S.C. 154(b) by 0 days.

(21) Appl. No.: 14/365,341

(22) PCT Filed: Jun. 19, 2012

(86) PCT No.: PCT/JP2012/003981
§ 371 (c)(1),
(2), (4) Date: Jun. 13, 2014

(87) PCT Pub. No.: WO2013/088592
PCT Pub. Date: Jun. 20, 2013

(65) Prior Publication Data
US 2014/0348579 A1 Nov. 27, 2014

(30) Foreign Application Priority Data
Dec. 16, 2011 (JP) .................... 2011-275277

(51) Int. Cl.
*F16C 3/02* (2006.01)
*B60K 17/22* (2006.01)

(52) U.S. Cl.
CPC . *F16C 3/02* (2013.01); *B60K 17/22* (2013.01); *Y10T 403/67* (2015.01)

(58) Field of Classification Search
CPC .......... F16C 3/02; B60K 17/22; Y10T 403/67
USPC ........................................................ 180/379
See application file for complete search history.

(56) References Cited

U.S. PATENT DOCUMENTS

| 2,909,233 A | * | 10/1959 | Kozub | B60K 17/22 180/353 |
| 5,469,931 A | | 11/1995 | Kawata et al. | |
| 5,868,517 A | * | 2/1999 | Aoki | B60K 17/22 403/221 |

(Continued)

FOREIGN PATENT DOCUMENTS

| DE | 611129 C | 3/1935 |
| DE | 19525271 A1 | 1/1997 |

(Continued)

OTHER PUBLICATIONS

Sugiura, Yasushi, JP10-211823 Propeller Shaft Supporting Structure and Propeller Shaft, Aug. 1998, English Machine Translation.*

(Continued)

*Primary Examiner* — Karen Beck
(74) *Attorney, Agent, or Firm* — Oliff PLC (57) ABSTRACT

A fall-off preventing structure of a propeller shaft does not allow a companion flange to be completely pulled off and dropped from a spline shaft when a nut loosens and comes off. In the propeller shaft, a round shaft part is provided on a front end of the spline shaft, a length of a threaded part of the spline shaft front end side on which the nut is screwed and the round shaft part is set longer than a length from a front end portion of the companion flange to a seat surface of the nut, and a total length of the length of the threaded part and the round shaft part and a length from the front end portion of the companion flange to the seat surface of the nut is set longer than the tolerable slide amount.

2 Claims, 7 Drawing Sheets

(56) References Cited

U.S. PATENT DOCUMENTS

| | | | |
|---|---|---|---|
| 6,379,255 B1* | 4/2002 | Cermak | F16D 3/22 464/162 |
| 2003/0050127 A1* | 3/2003 | Barrett | F16C 3/02 464/180 |
| 2008/0053735 A1* | 3/2008 | Maucher | F16D 3/065 180/256 |
| 2011/0070957 A1* | 3/2011 | Ball | B60K 17/22 464/180 |
| 2013/0203304 A1* | 8/2013 | Jenkins | B60F 3/0007 440/12.57 |
| 2014/0348579 A1* | 11/2014 | Ono | B60K 17/22 403/342 |
| 2014/0378235 A1* | 12/2014 | Jenkins | F16D 3/06 464/106 |
| 2015/0075897 A1* | 3/2015 | Copeland | B60K 17/22 180/383 |
| 2015/0111653 A1* | 4/2015 | Choi | B62D 1/192 464/183 |

FOREIGN PATENT DOCUMENTS

| | | |
|---|---|---|
| JP | S53-83934 U | 7/1978 |
| JP | 6-156099 A | 6/1994 |
| JP | 6-49842 U | 7/1994 |
| JP | 7-31453 U | 6/1995 |
| JP | 10-211823 A | 8/1998 |
| JP | 2000-79827 A | 3/2000 |
| JP | 2009-73385 A | 4/2009 |
| JP | 2011-001055 A | 1/2011 |

OTHER PUBLICATIONS

Nov. 11, 2015 Extended European Search Report issued in European Patent Application No. 12856770.8.

Dec. 8, 2015 Office Action issued in Japanese Patent Application No. 2011-275277.

* cited by examiner

FALL-OFF PREVENTING STRUCTURE OF PROPELLER SHAFT

CROSS-REFERENCE TO RELATED APPLICATION

This application is a U.S. National Stage application claiming the benefit of prior filed International Application Number PCT/JP2012/003981, filed on Jun. 19, 2012, in which the International Application claim a priority date of Dec. 16, 2011 based on prior filed Japanese Patent Application Number 2011-275277, the entire contents of which are incorporated herein by reference.

TECHNICAL FIELD

The present application relates to a fall-off preventing structure of a propeller shaft.

BACKGROUND ART

In a vehicle driving system, a propeller shaft is connected between a transmission and a final reduction gear, motive power of an engine is transmitted from the transmission to the final reduction gear via the propeller shaft, and moreover, the motive power is transmitted to a driving wheel side of a vehicle rear part via the final reduction gear.

Figure 7:
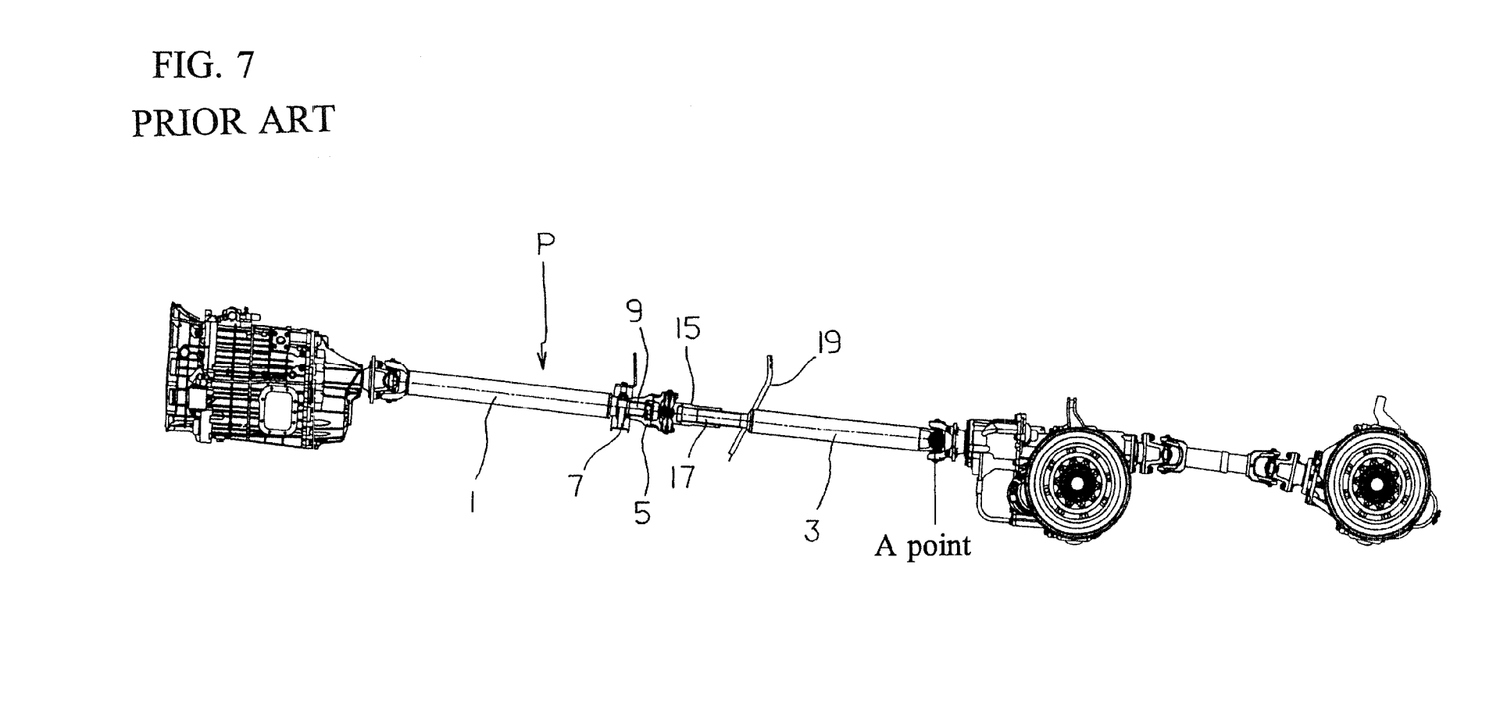
FIG. 7 is a side view of a vehicle driving system having a conventional propeller shaft.
Figure 8:
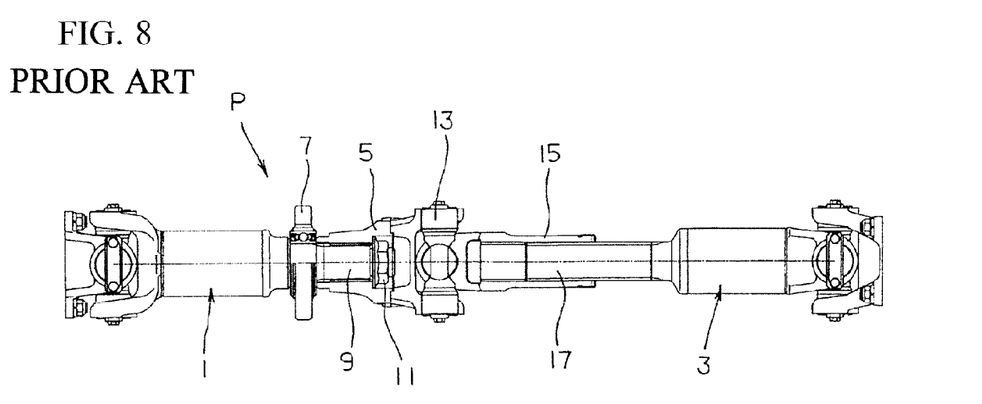
FIG. 8 is a side view of a normal state of the propeller shaft illustrated in FIG. 7.

Further, in a large truck or the like which is front-engine, rear-wheel-drive and has a long wheel base, as illustrated in FIG. 7 and FIG. 8, a propeller shaft P is divided into a first propeller shaft 1 and a second propeller shaft 3, both the propeller shafts 1, 3 are coupled by a companion flange 5, and the propeller shaft P is supported on the frame by a center bearing 7.

As illustrated in FIG. 8, the companion flange 5 is spline-fitted on a spline shaft 9 of the first propeller shaft 1, and a nut 11 is screwed on a front end side end of the spline shaft 9, to thereby fasten and fix the companion flange 5 in an axial direction of the spline shaft 9.

Then, to the companion flange 5, a spline yoke 15 of the second propeller shaft 3 is coupled via a universal joint 13, and a spline shaft 17 of the second propeller shaft 3 is spline fitted in the spline yoke 15.

Incidentally, the propeller shaft P may undergo part replacement by removing the nut 11 during maintenance, and the nut 11 has to be fastened by a regular method after the operation.

Figure 9:
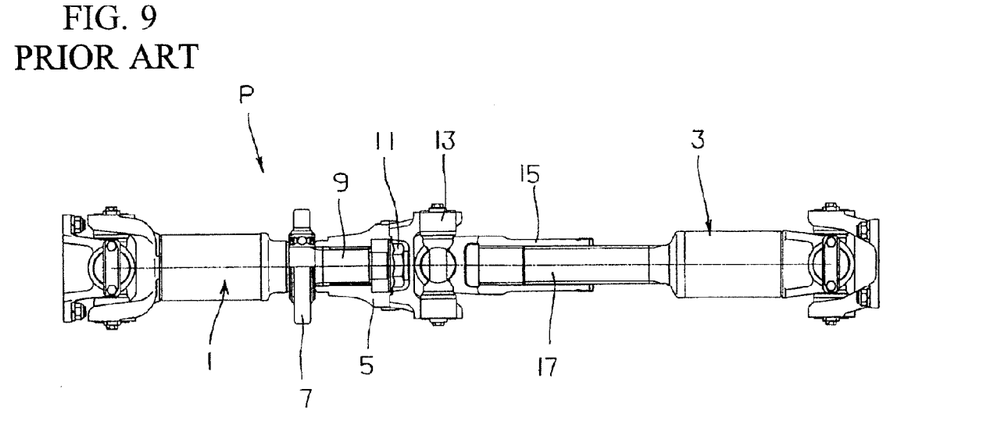
FIG. 9 is a side view of the propeller shaft in a state that the nut loosened and came off.
Figure 10:
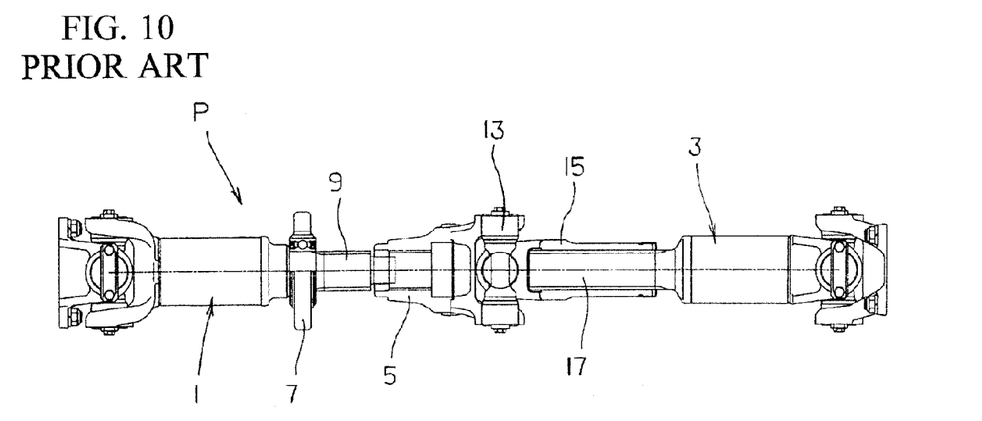
FIG. 10 is a side view of the propeller shaft in a state that the second propeller shaft became shortest.
Figure 11:
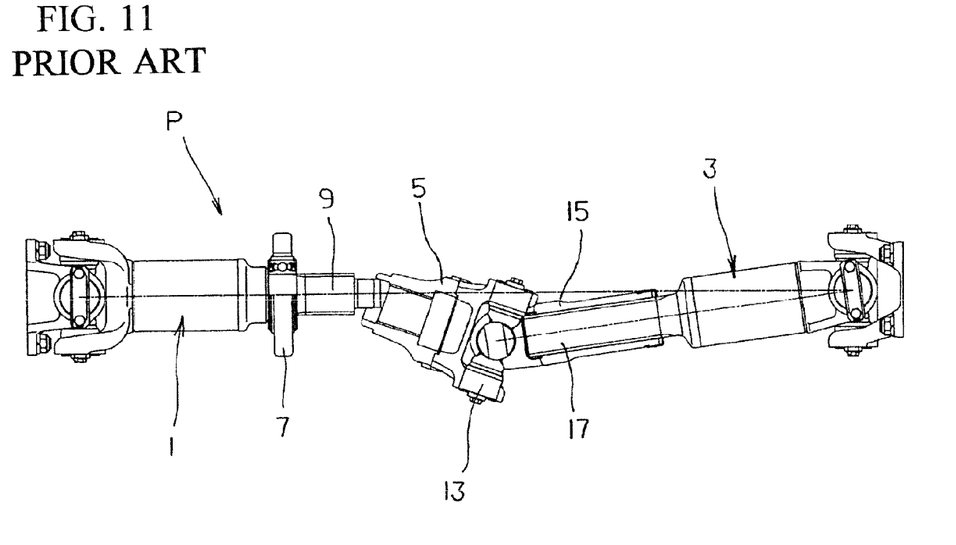
FIG. 11 is a side view of the propeller shaft in a state that the companion flange is pulled off.

However, when the nut 11 is used in a loose state due to an operational error, a part defect, or the like, there is a concern that the nut 11 comes off while traveling as illustrated in FIG. 9, the companion flange 5 is pulled off from the spline shaft 9 in a state that the second propeller shaft 3 became shortest as illustrated in FIG. 10, FIG. 11, and thereafter the companion flange 5 falls off to the road together with the spline yoke 15 of the second propeller shaft 3.

As a result, the second propeller shaft 3 is no longer supported by the first propeller shaft 1, and hence there is a concern that it swings around about an A point being a fulcrum in FIG. 7, thereby breaking a propeller shaft protector 19 and then damaging surrounding units. Note that in the nut 11 is omitted from illustration in FIG. 10 and FIG. 11.

Figure 12:
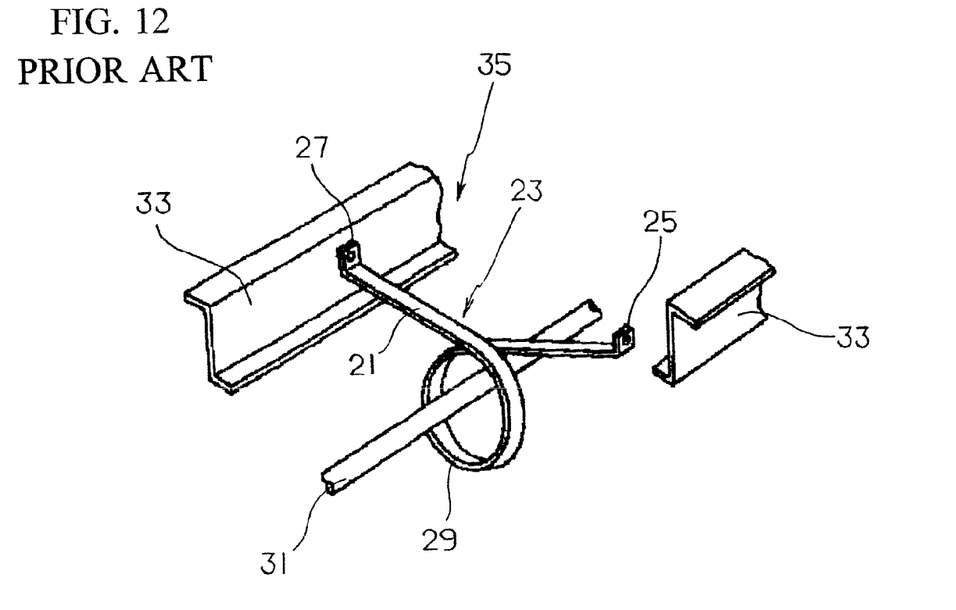
FIG. 12 is a perspective view of a protection device of the conventional propeller shaft.

On the other hand, Patent Document 1 discloses a protection device 35 of a propeller shaft, in which opposite ends 25, 27 of a protection member 23 made by bending and crossing a beam member 21 in a loop shape are attached to a chassis frame 33 in a state of surrounding the propeller shaft 31 by a loop shaped part 29 as illustrated in FIG. 12, thereby preventing the propeller shaft 31 from falling off.

Patent Document 1: Japanese Unexamined Utility Model Application Publication No. H07-31453.

DISCLOSURE

Problems to be Solved

However, the protection device 35 is intended to receive the propeller shaft 31 in a buffering manner by the loop-shaped part 29 when the propeller shaft 31 is broken and falls off, which is not to actively prevent breakage of the propeller shaft.

The present invention has been made in view of such a situation, and it is a proposal thereof to provide a fall-off preventing structure of a propeller shaft which does not allow a companion flange to be completely pulled off and drop from a spline shaft when a nut loosens and comes off.

Means for Solving the Problems

To achieve such a proposal, a fall-off preventing structure of a propeller shaft, according to a first aspect of the embodiment, being divided into a first propeller shaft and a second propeller shaft includes a companion flange spline fitting on a spline shaft of the first propeller shaft, a nut being screwed on a front end side of the spline shaft, thereby fastening and fixing the companion flange in an axial direction of the spline shaft, a spline shaft of the second propeller shaft spline fitting in a spline yoke of the second propeller shaft coupled to the companion flange via a universal joint, and a spline engagement length of the companion flange and the spline shaft of the first propeller shaft being shorter than a tolerable slide amount of the spline yoke and the spline shaft of the second propeller shaft, in which a round shaft part is provided on a front end of the spline shaft on which the nut is screwed, a length of a threaded part of the spline shaft front end side on which the nut is screwed and the round shaft part is set longer than a length from a front end portion of the companion flange to a seat surface of the nut, and a total length of the length of the threaded part and the round shaft part and a length from the front end portion of the companion flange to the seat surface of the nut is set longer than the tolerable slide amount.

Then, a fall-off preventing structure of a propeller shaft, according to a second aspect of the embodiment, being divided into a first propeller shaft and a second propeller shaft includes a companion flange spline fitting on a spline shaft of the first propeller shaft, a nut being screwed on a front end side of the spline shaft, thereby fastening and fixing the companion flange in an axial direction of the spline shaft, and a spline shaft of the second propeller shaft spline fitting in a spline yoke of the second propeller shaft coupled to the companion flange via a universal joint, in which a round shaft part is provided on a front end of the spline shaft on which the nut is screwed, and a spline engagement length of the companion flange and the spline shaft of the first propeller shaft is set longer than a tolerable slide amount of the spline yoke and the spline shaft of the second propeller shaft.

Effects

According to the invention and according to a first aspect of the embodiment, when the nut for fastening the companion flange loosens and comes off and the companion flange is being pulled off from the spline shaft, the inside of the companion flange comes in contact with the front end of the round shaft part and the companion flange cannot be pulled off any further from the spline shaft, and thus the companion flange does not completely fall off from the spline shaft.

Further, since the inside of the companion flange comes in contact with the front end of the round shaft part in this manner, the width of swinging around of the second propeller shaft is suppressed at the minimum and surrounding devices such as brake piping will not be damaged, and thus, under abnormal conditions, the vehicle can be stopped by a normal braking operation.

Moreover, when the nut loosens and comes off, the companion flange idles on the round shaft part and torque transmission is interrupted, where it has an advantage that the driver can instantly perceive the abnormality.

According to the invention and according to a second aspect of the embodiment, when the nut loosens and comes off, the companion flange does not fall off from the spline shaft because the spline engagement length is longer than the tolerable slide amount, and thus the second propeller shaft does not swing around and damage surrounding devices.

Further, when the nut loosens and comes off, although the spline engagement length decreases gradually, if torque input continues in a state that the spline engagement length is decreased, abnormal vibrations occur or torque transmission is interrupted due to wear of splines, and thus there is an advantage that the driver can instantly perceive abnormality of the propeller shaft.

DETAILED DESCRIPTION OF THE EMBODIMENTS

Hereinafter, embodiments of the present invention will be described in detail based on drawings. Note that the same components as those in the conventional example illustrated in FIG. 7 and so on are denoted by the same numerals.

FIG. 1 to FIG. 5 illustrate a fall-off preventing structure of a propeller shaft according to one embodiment of claim 1, in which, similarly to a propeller shaft P illustrated in FIG. 7, a propeller shaft P1 is divided into a first propeller shaft 41 and a second propeller shaft 3, and both the propeller shafts 41, 3 are coupled via a companion flange 43.

Figure 1:
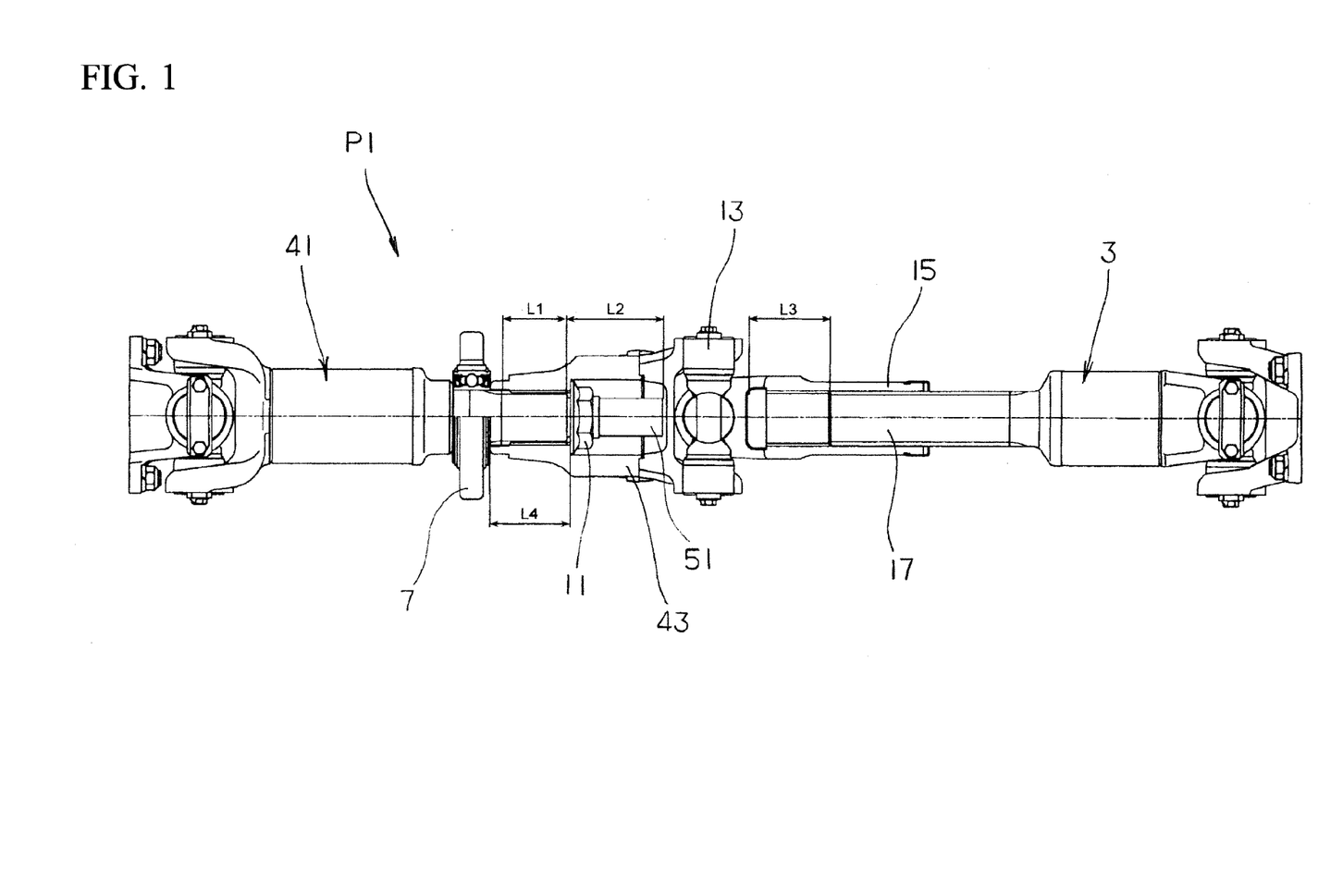
FIG. 1 is a side view of a propeller shaft having a fall-off preventing structure according to one embodiment of claim 1.
Figure 2:
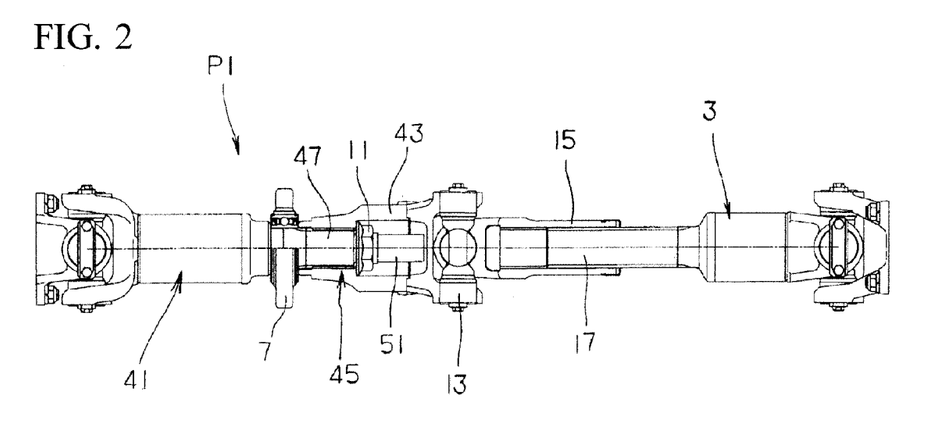
FIG. 2 is a side view of a normal state of the propeller shaft illustrated in FIG. 1.
Figure 3:
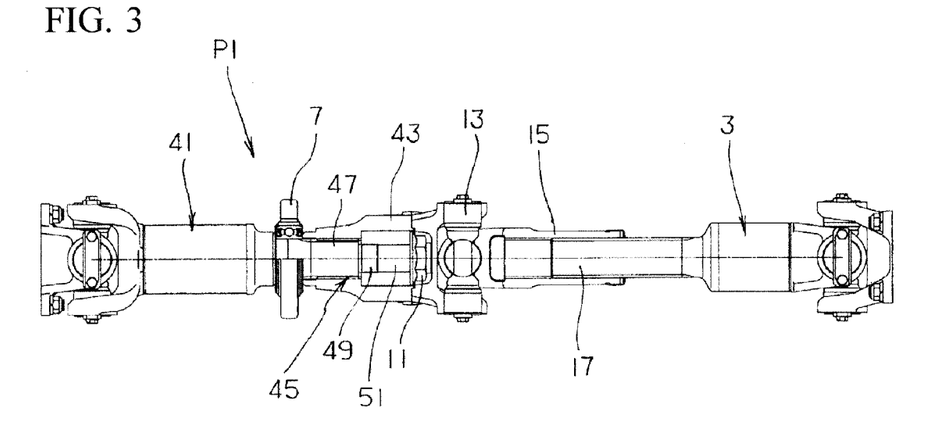
FIG. 3 is a side view of the propeller shaft in a state that the nut loosened and came off.

As illustrated in FIG. 1 to FIG. 3, in a spline shaft 45 of the first propeller shaft 41, in addition to a spline part 47 on which the companion flange 43 spline fits, a threaded part 49 on which a nut 11 is screwed is formed in a substantially center portion of the spline shaft 45, and a round shaft part 51 is formed to a front end side of the spline shaft 45. Then, by screwing the nut 11 on the threaded part 49, the companion flange 43 is fastened and fixed in an axial direction of the spline shaft 45.

Further, a spline yoke 15 of the second propeller shaft 3 is coupled via a universal joint 13 to the companion flange 43, and a spline shaft 17 of the second propeller shaft 3 is spline fitted in the spline yoke 15.

Then, as illustrated in FIG. 1, a spline engagement length L1 of the companion flange 43 and the spline shaft 45 is shorter than a tolerable slide amount (tolerable slide amount of the second propeller shaft 3) L3 of the spline yoke 15 and the spline shaft 17 (L1<L3).

Then, this embodiment is characterized in that, in the propeller shaft P1 structured as described above, a length L2 of the threaded part 49 and the round shaft part 51 is set longer than a length L4 from a front end portion of the companion flange 43 to a seat surface of the nut 11 (L2>L4), and a total length of the length L2 of the threaded part 49 and the round shaft part 51 and the length L4 from the front end portion of the companion flange 43 to the seat surface of the nut 11 is set longer than the tolerable slide amount L3 (L2+L4>L3). Note that in FIG. 4 and FIG. 5, the nut 11 is omitted from illustration.

Since this embodiment is structured thus, when the nut 11 is fastened by sufficient tightening torque on the threaded part 49, the propeller shaft P1 expands or contracts in the range of the tolerable slide amount L3 in a normal state illustrated in FIG. 2, motive power of the engine is transmitted to a final reduction gear from a transmission via the propeller shaft P1, and the motive power is transmitted from the final reduction gear to a driving wheel side of a vehicle rear section.

Figure 4:
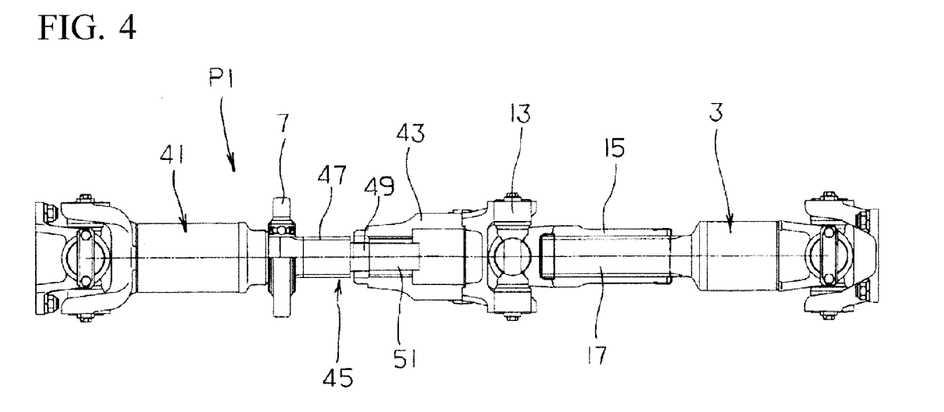
FIG. 4 is a side view of the propeller shaft in a state that the second propeller shaft became shortest.

On the other hand, when the nut 11 is used in a loose state due to an operational error, a part defect, or the like, the nut 11 comes off while traveling as illustrated in FIG. 3, the companion flange 43 begins to be pulled off from the spline shaft 45 and the spline engagement length L1 decreases gradually, and the second propeller shaft 3 shortens gradually. FIG. 4 illustrates a state that the second propeller shaft 3 became shortest (tolerable slide amount L3=0).

Figure 5:
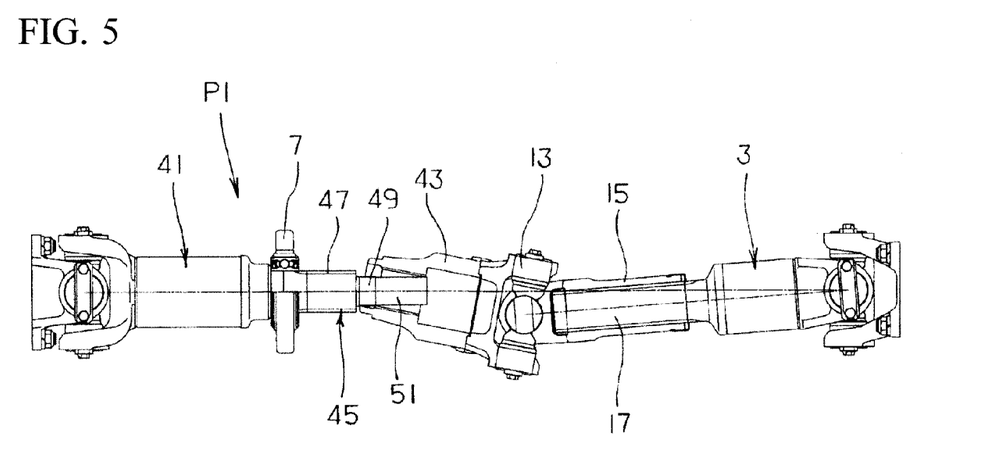
FIG. 5 is a side view of the propeller shaft in a state that a companion flange is being pulled off.

However, from the state of FIG. 4, when the companion flange 43 is being pulled off from the spline shaft 45 as illustrated in FIG. 5, since the length L2 of the threaded part 49 and the round shaft part 51 is set longer than the length L4 from the front end portion of the companion flange 43 to the seat surface of the nut 11 (L2>L4) and the total length of the length L2 of the threaded part 49 and the round shaft part 51 and the length L4 from the front end portion of the companion flange 43 to the seat surface of the nut 11 is set longer than the tolerable slide amount L3 (L2+L4>L3), an inside of the companion flange 43 comes in contact with a front end of the round shaft part 51 and the companion flange 43 cannot be pulled off any further from the spline shaft 45, and thus the companion flange 43 idles on the round shaft part 51. As a result, the torque transmission (motive power transmission to the final reduction gear) is interrupted.

Further, in this manner, by that the companion flange 43 cannot be pulled off from the spline shaft 45 and the inside of the companion flange 43 comes in contact with the front end of the round shaft part 51, the width of swinging around of the second propeller shaft 3 is suppressed at the minimum.

Thus, in the fall-off preventing structure of the propeller shaft P1 according to this embodiment, when the nut 11 loosens and comes off and the companion flange 43 is being pulled off from the spline shaft 45, the inside of the companion flange 43 comes in contact with the front end of the round shaft part 51 and the companion flange 43 cannot be pulled off any further from the spline shaft 45, and thus the companion flange 43 does not completely fall off from the spline shaft 45.

Further, since the inside of the companion flange 43 comes in contact with the front end of the round shaft part 51 in this manner, the width of swinging around of the second propeller shaft 3 is suppressed at the minimum and surrounding devices such as brake piping will not be damaged, and thus, under abnormal conditions, the vehicle can be stopped by a normal braking operation.

Moreover, when the nut 11 loosens and comes off as described already, the companion flange 43 idles on the round shaft part 51 and torque transmission is interrupted, where it has an advantage that the driver can instantly perceive the abnormality.

Figure 6:
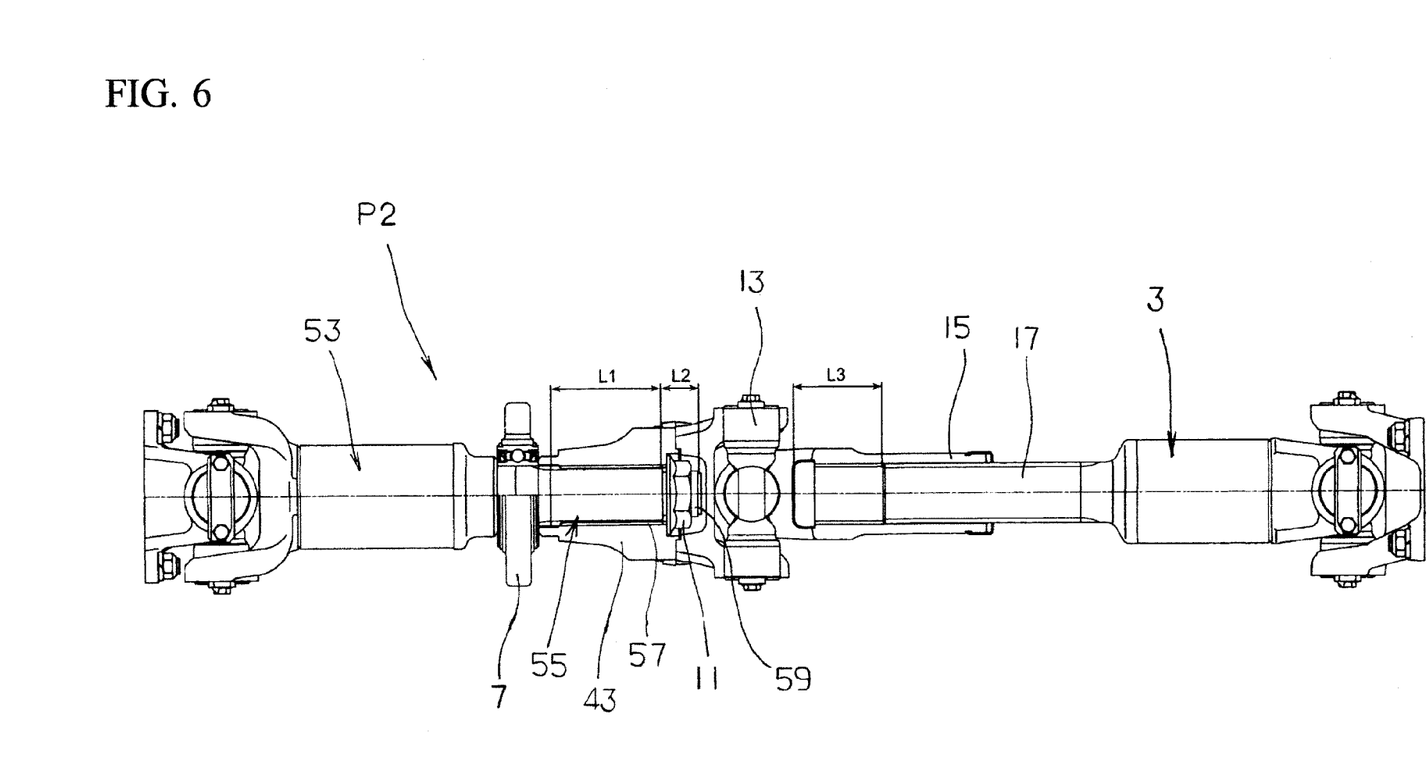
FIG. 6 is a side view of a propeller shaft having a fall-off preventing structure according to one embodiment of claim 2.

FIG. 6 illustrates a fall-off preventing structure of a propeller shaft according to one embodiment of claim 2, in which a propeller shaft P2 of this embodiment is divided into a first propeller shaft 53 and a second propeller shaft 3, and both the propeller shafts 55, 3 are coupled via a companion flange 43.

Then, a spline part 57 on which the companion flange 43 spline fits is formed in a spline shaft 55 of the first propeller shaft 53, a threaded part on which a nut 11 is screwed is formed in a front end side of the spline shaft 55, and a round shaft part 59 is formed in a front end of the spline shaft 55.

Thus, this embodiment, in the structure as described above, is characterized in that a length L2 of the threaded part and the round shaft part 59 is set short and a spline engagement length L1 of the companion flange 43 and the spline shaft 55 is formed to be long as compared to the propeller shaft P1 of FIG. 1, and the spline engagement length L1 of the companion flange 43 and the spline shaft 55 is set longer than a tolerable slide amount (tolerable slide amount of the second propeller shaft 3) L3 of the spline yoke 15 and the spline shaft 17 (L1>L3). Note that the other structure is the same as that of the above-described embodiment, and thus the same components are designated by the same reference numerals and their descriptions are omitted.

Since this embodiment is structured thus, when the nut 11 is fastened by sufficient tightening torque on the threaded part, the propeller shaft P2 expands or contracts in the range of the tolerable slide amount L3, and torque transmission is performed via the propeller shaft P2.

On the other hand, when the nut 11 is used in a loose state due to an operational error, a part defect, or the like, the nut 11 comes off while traveling, the companion flange 43 begins to be pulled off from the spline shaft 45, and the spline engagement length L1 decreases gradually.

However, since the spline engagement length Li of the companion flange 43 and the spline shaft 55 is set longer than the tolerable slide amount (tolerable slide amount of the second propeller shaft 3) L3 of the spline yoke 15 and the spline shaft 17 (L1<L3), the companion flange 43 does not fall off from the spline shaft 45.

Then, when torque input (motive power transmission from the engine) continues in a state that the spline engagement length L1 of the companion flange 43 and the spline shaft 55 is decreased, abnormal vibrations occur and torque transmission is interrupted due to wear of splines.

Thus, in the fall-off preventing structure of the propeller shaft P2 according to this embodiment, when the nut 11 loosens and comes off, the companion flange 43 does not fall off completely from the spline shaft 45, and thus the second propeller shaft 3 does not swing around and damage surrounding devices.

Further, when the nut 11 loosens and comes off, although the spline engagement length L1 decreases gradually, if torque input continues in a state that the spline engagement length L1 is decreased, abnormal vibrations occur or torque transmission is interrupted due to wear of splines, and thus there is an advantage that the driver can instantly perceive abnormality of the propeller shaft P2.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

3 Second propeller shaft
7 Center bearing
11 Nut
13 Universal joint
15 Spline yoke of second propeller shaft
17 Spline shaft of second propeller shaft
41, 53 First propeller shaft
43 Companion flange
45, 55 Spline shaft of the first propeller shaft
47, 57 Spline part
49 Threaded part
51, 59 Round shaft part
P1, P2 Propeller shaft
L1 Spline engagement length
L2 Length of the threaded part and the round shaft part
L3 Tolerable slide amount of the second propeller shaft
L4 Length from a front end portion of the companion flange to a seat surface of the nut

The invention claimed is:

1. A fall-off preventing structure of a propeller shaft comprising:
 a first propeller shaft having a first spline shaft on one end side in an axial direction thereof;
 a second propeller shaft having a spline yoke and a second propeller shaft which is fitted to the spline yoke and slideable in the axial direction of the spline yoke; and
 a companion flange coupling the first propeller shaft and the second propeller shaft, wherein
 on the one end side of the first propeller shaft, a front end round shaft part (i) to which a nut is screwed from the one side to fix the coupling of the first propeller shaft and the companion flange and (ii) extending in the axial direction of the first propeller shaft is formed,
 in a mounting part of the first propeller shaft of the companion flange, the first spline shaft and the front end round shaft part are inserted,
 an axial length of a portion where the first spline shaft is inserted in the mounting part is set to be shorter than an axial length of the front end round shaft part,
 a sum of the axial length of the portion where the first spline shaft is inserted in the mounting part and the axial length of the front end round shaft part is set longer than a tolerable slide amount in an axial direction of the spline yoke and the second spline shaft in the second propeller shaft.

2. A fall-off preventing structure of a propeller shaft comprising:
a first propeller shaft having a first spline shaft on one end side in an axial direction thereof;
a second propeller shaft having a spline yoke and a second propeller shaft which is fitted to the spline yoke and slidable in the direction of the spline yoke; and
a companion flange coupling the first propeller shaft and the second propeller shaft, wherein
in a mounting part of the first propeller shaft of the companion flange, the first spline shaft is inserted,
a spline engagement length of the first spline shaft and the companion flange in the mounting part is set longer than a tolerable slide amount of the spline yoke and the second spline shaft in the second propeller shaft.

* * * * *